United States Patent [19]

Ogawa

[11] Patent Number: 5,064,220
[45] Date of Patent: Nov. 12, 1991

[54] SEAT BELT DEVICE
[75] Inventor: Kiyoshi Ogawa, Fujisawa, Japan
[73] Assignee: Nippon Seiko Kabushiki Kaisha, Tokyo, Japan
[21] Appl. No.: 540,949
[22] Filed: Jun. 20, 1990
[30] Foreign Application Priority Data
  Jun. 28, 1989 [JP] Japan .................. 1-75749[U]
[51] Int. Cl.⁵ .................................. B60R 22/00
[52] U.S. Cl. ...................... 280/801; 280/805; 280/806; 180/268
[58] Field of Search ............. 280/801, 806, 805; 180/268; 297/468, 473

[56] References Cited
U.S. PATENT DOCUMENTS

| 4,260,178 | 4/1981 | Kluting | 280/806 |
| 4,451,087 | 5/1984 | Tamamushi | 280/801 |
| 4,729,602 | 3/1988 | Tokugawa | 297/468 |

FOREIGN PATENT DOCUMENTS

| 2802616 | 7/1979 | Fed. Rep. of Germany | 297/468 |
| 2802617 | 7/1979 | Fed. Rep. of Germany | 297/473 |
| 3011165 | 10/1981 | Fed. Rep. of Germany | 297/468 |
| 63-32951 | 3/1988 | Japan . | |

Primary Examiner—Kenneth R. Rice
Assistant Examiner—M. Shaughnessy
Attorney, Agent, or Firm—Wegner, Cantor, Mueller & Player

[57] ABSTRACT

A seat belt device for an automotive vehicle includes a safety belt, and a buckle by which the belt is releasably retained. The buckle is arranged at a lateral side of a vehicle seat, and supported by a linkage formed by first and second stays. The first stay has one end thereof pivoted to the vehicle body, while the second stay engages the first stay for pivotal movement relative thereto, and has the buckle secured thereto. A stopper is provided on one of the first and second stays, and disposed to abut against the other stay when the first and second stays pivotally move in a direction in which the linkage extends, to thereby restrain further pivotal movement of the first and second stays in the same direction.

8 Claims, 5 Drawing Sheets

SEAT BELT DEVICE

BACKGROUND OF THE INVENTION

This invention relates to a seat belt device adapted for use in automotive vehicles, and more particularly to a device of this kind which has an improved buckle-supporting structure which imparts enhances the initial restrainability of the occupant in the event of a collision of the vehicle.

Seat belt devices of a three-point type are generally used at a driver's seat, an assistant driver's seat, etc. in automotive vehicles. The three-point type seat belt device has a safety belt which first upwardly extends from a retractor anchored to a lower portion of a pillar of the vehicle body close to a door and then downwardly turned back by a guide member mounted on an upper portion of the pillar, with one end thereof fixed to an anchor plate mounted on a lower portion of the pillar. An intermediate portion of the safety belt is pulled by the occupant and releasably retained by a buckle arranged at a central lateral side of a seat. The buckle is supported by the vehicle body through a linkage to assure positive restraint of the occupant in the event of a collision of the vehicle, etc. In the case where the seat is adjustable in vertical position, the buckle is preferably vertically movable to follow the adjusted vertical position of the seat, to permit the safety belt to be easily mated with the buckle and released therefrom. To this end, various buckle-supporting structures have so far been developed. For example, such a buckle-supporting structure has been proposed by Japanese Provisional Patent Publication (Kokai) No. 63-32951, which employs a flexible linkage.

FIG. 1 shows an example of conventional seat belt device to which a linkage is applied. A buckle 4 is arranged at a central or inner lateral side of a vertically-adjustable cushioned seat 1 and supported by a flexible linkage 5, to receive a tongue plate 3 fitted on a safety belt 2, which is releasably inserted into the buckle 4.

The linkage 5 comprises a first stay 7 having one end thereof pivoted to a fulcrum shaft 6 fixed to a vehicle body for pivotal movement thereabout, and a second stay 10 having one end thereof engaged, through an engaging pin 8 and a through hole 9, with the other end of the first stay 7, for movement in vertical directions, as shown by the arrow a, as well as for pivotal movement back and forth, as shown by the arrow b. The buckle 4 is secured to the other end of the second stay 10.

With such arrangement, whenever the cushioned seat 1 is vertically adjusted, the buckle 4 moves vertically through pivotal motion of the first and second stays 7, 10, to thereby follow the adjusted vertical position of the seat 1.

However, according to the conventional device described above, the through hole 9 is elongate along the direction of extension of the linkage 5, to obtain a large stroke of extension and contraction of the linkage 5. As a consequence, when a tension load is applied to the belt 2 in the event of an impact upon the device, such as a collision of the vehicle, the linkage 5 is extended into such a position that the first and second stays 7, 10 form a straight line, as shown by the two-dot-chain lines in FIG. 1.

During extension of the linkage 5, the belt 2 is ineffective to restrain the occupant. As a consequence, when the vehicle undergoes a collision, the timing of starting restraint of the occupant is retarded to increase the inertial motion amount of the occupant, thereby making it difficult to positively protect the occupant, particularly his head, from being accelerated.

SUMMARY OF THE INVENTION

It is therefore the object of the invention to provide a seat belt device for automotive vehicles, which is capable of reducing the amount of extension of the linkage for supporting the buckle, to thereby improve the initial restrainability of the occupant and hence fully protect the occupant, in the event of a collision of a vehicle.

To achieve the above object, the present invention provides a seat belt device for an automotive vehicle having a body, and seats arranged within the body, the device including a safety belt, a buckle by which the safety belt is releasably retained, the buckle being arranged at one of the seats at a lateral side thereof, linkage means for supporting the buckle, the linkage means having first and second stays, the first stay having one end thereof pivoted to the body of the vehicle, the second stay engaging the first stay for pivotal movement relative thereto, the second stay having the buckle secured thereto, The seat belt device according to the present invention is characterized by an improvement comprising a stopper provided on one of the first and second stays, the stopper being disposed to abut against the other of the first and second stays when the first and second stays pivotally move in a direction in which the linkage means extends, to thereby restrain further pivotal movement of the first and second stays in that direction.

Preferably, the linkage means includes an engaging protuberance provided on one of the first and second stays, and an engaging recess formed in the other of the first and second stays, the engaging recess extending in a direction in which the other of the first and second stays pivotally moves, the engaging protuberance being engaged in the engaging recess for sliding movement therealong while the first and second stays pivotally move in the direction.

More preferably, the stopper is located at such a location that the stopper abuts against the other of the first and second stays simultaneously when the engaging protuberance abuts against one end edge of the engaging recess.

Also preferably, the first stay is selectively held by link holder means at any of a plurality of different positions in the direction of advancement of the vehicle.

The above and other objects, features, and advantages of the invention will become more apparent from the ensuing detailed description taken in conjunction with the accompanying drawings.

DETAILED DESCRIPTION

Figure 1:
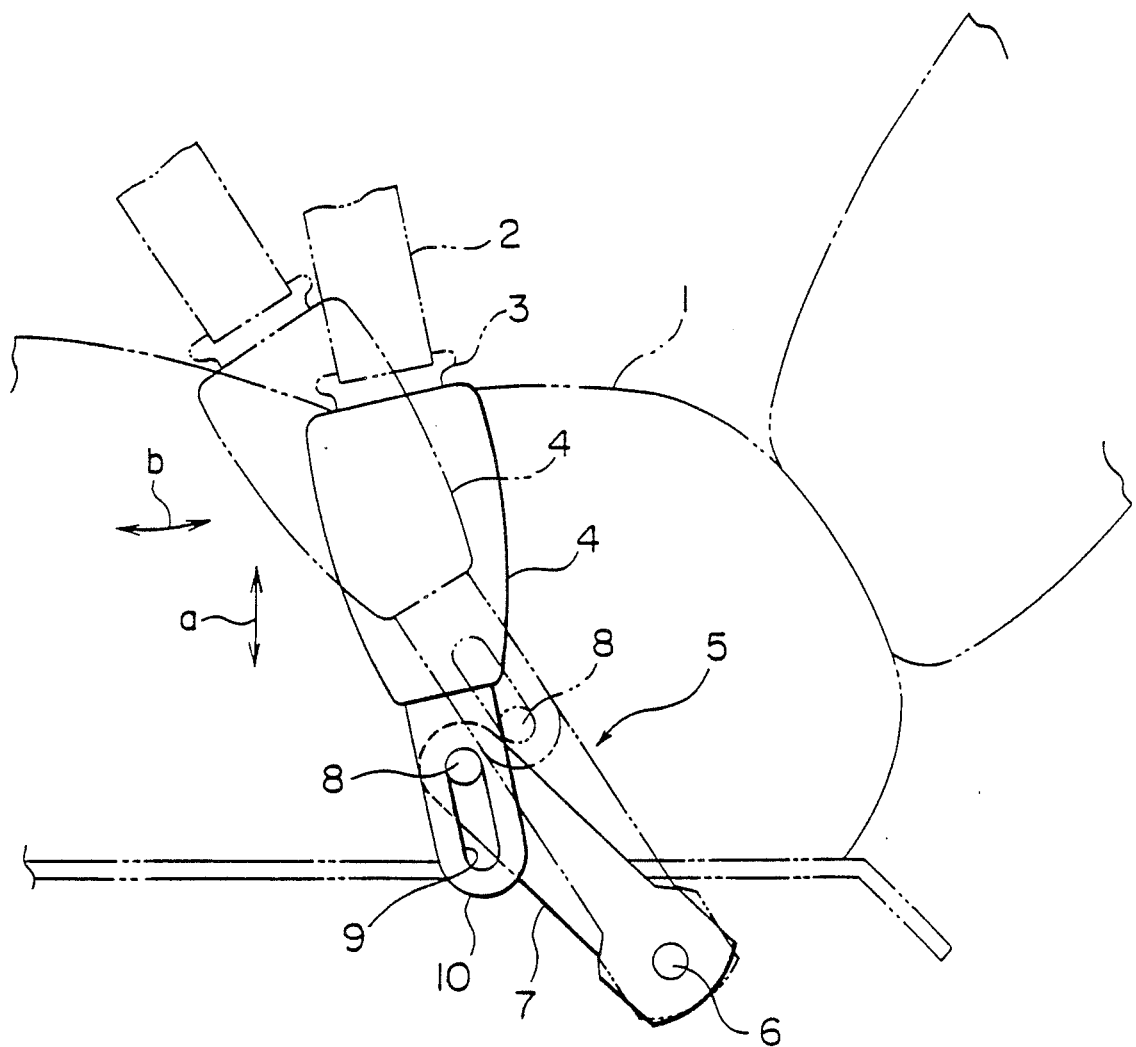
FIG. 1 is a schematic view of a linkage of a conventional seat belt device, useful in explaining the operation thereof.

The invention will now be described in detail with reference to FIGS. 2 through 5, showing an embodiment thereof. The illustrated embodiment of the invention is directed to a three-point type seat belt device, which is arranged in a driver's seat or an assistant driver's seat of an automotive vehicle.

In the figures, reference numeral 11 represents a cushioned seat which is adjustable in vertical position by means of a lifter, not shown. The cushioned seat 11 has a buckle-receiving hole 12 formed in a lateral side wall thereof close to the center of an occupant compartment of the vehicle. A buckle 13 is supportedly received through a retaining pad 12a in the buckle-receiving hole 13 such that the buckle 13 can be moved in unison with the seat 11. A tongue plate 15 fitted on a safety belt 14 is releasably fitted into the buckle 13. The safety belt 14 can be unwound from a retractor and a guide member, neither shown, disposed, respectively, in upper and lower portions of a pillar of the vehicle body close to a door of the occupant compartment.

The buckle 13 is supported by a linkage 16 which comprises a first stay 18, and a second stay 21 engaging therewith. The first stay 18 has one end thereof pivoted to a vehicle body through a fulcrum shaft or bolt 17 for pivotal movement about the fulcrum shaft 17 in vertical directions as viewed in FIG. 5. The second stay 21 has one end thereof engaged with the other end of the first stay 18 through an engaging pin 19 secured to the second stay 21 and an engaging hole 20 formed in the first stay 18, for pivotal movement in vertical directions, as shown by the arrow a in FIG. 5, and in horizontal directions, as shown by the arrow b in the same figure, together with the buckle 13 secured to the other end thereof.

More specifically, the first stay 18 is in the form of a flat plate, while the second stay 21 is in the form of a U-bent plate. The swinging end portion of the first stay 18 is movably fitted in the U-shaped bottom of the second stay 21. The engaging hole 20 is formed through the swinging end portion of the first stay 18 and has an arcuate shape extending by a given length along an orbital path depicted by the swinging end of the first stay 18. Alternatively, the through hole 20 may be a straight elongate hole. The engaging pin 19 has both ends thereof secured to opposite side walls of the U-bent second stay 21, and an intermediate portion thereof slidably fitted through the through hole 20, so that the second stay 21 can slide on the engaging pin 19 of the first stay 18 and pivotally moves about same. The outer diameter of the engaging pin 19 is slightly smaller than the width of the through hole 20 to provide a moderate clearance therebetween.

Figure 5:
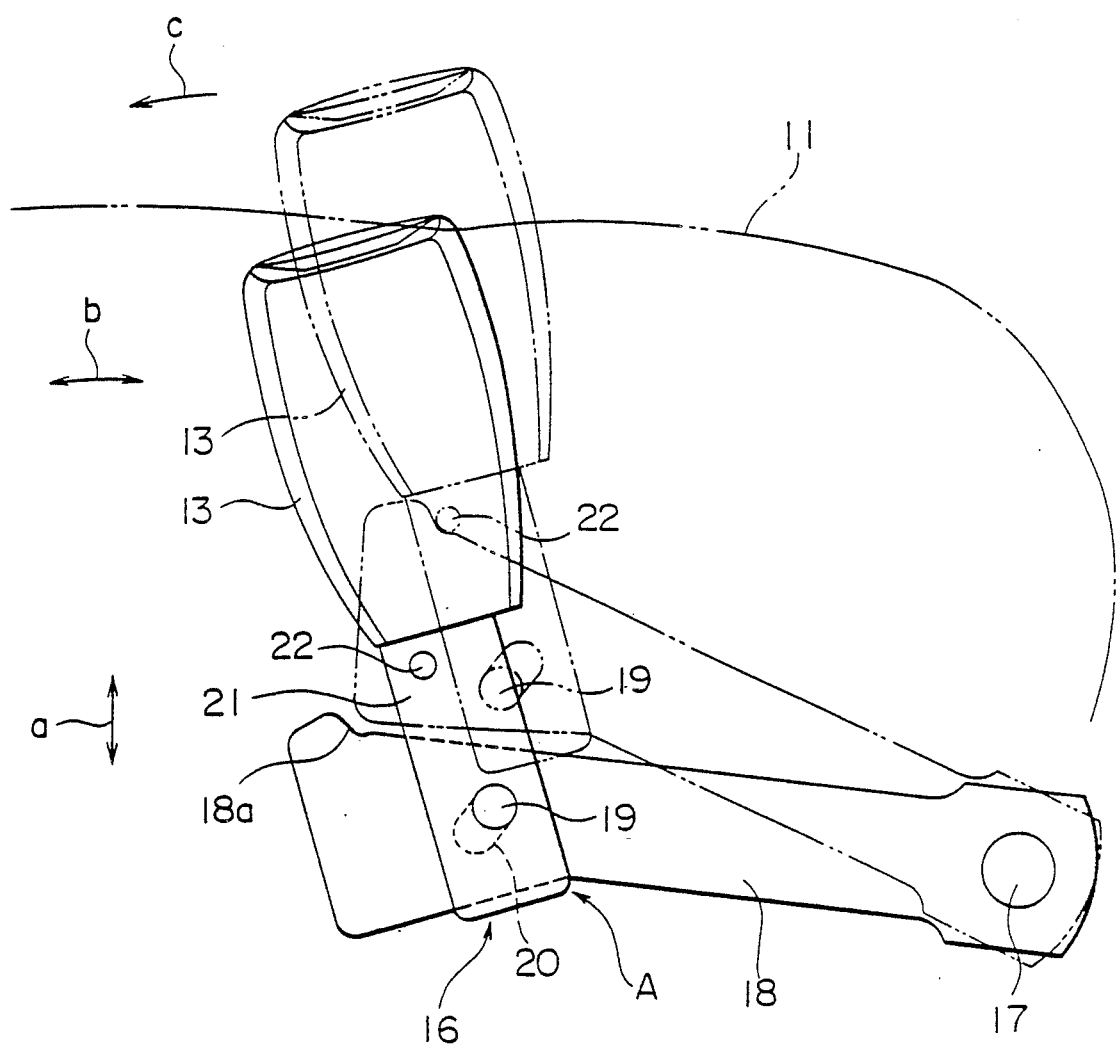
FIG. 5 is a view of a linkage of the device of FIG. 2, useful in explaining the operation thereof.

When the cushioned seat 11 is in the lowermost position, the linkage 16 correspondingly assumes a position shown by the solid lines in FIG. 5. In this position, the engaging pin 19 abuts against an upper end edge of the through hole 20, and at the same time a lower side edge of the first stay 18 abuts against the U-shaped bottom of the second stay 21, as indicated by the symbol A in FIG. 5.

On the other hand, when the seat 11 is in the uppermost position or when the vehicle undergoes a collision, the linkage 16 assumes a position shown by the two-dot-chain lines in FIG. 5. To assume this position, the second stay 21 moves in a forward direction of the vehicle (i.e. in a direction indicated by the arrow c in FIG. 5) relative to the first stay 18, and at the same time the first stay 18 swings upward about the fulcrum shaft 17, from the position shown by the solid lines in FIG. 5. This swinging motion of the linkage 16 takes place about the abutting point A of the lower side edge of the first stay 18 against the U-shaped bottom of the second stay 21. During the swinging motion of the linkage 16, the engaging pin 19 downwardly slides along the through hole 20 relative to the first stay 18.

A stopper pin 22 is secured to the opposite side walls of the second stay 21 at a location above the first stay 18. When the second stay 21 swings by a certain angle in the forward direction of the vehicle (i.e. in the direction c in FIG. 5) relative to the first stay 18, the stopper pin 22 abuts against an upper side edge 18a of the swinging end portion of the first stay 18. The stopper pin 22 is located such that the upper side edge 18a of the first stay 18 abuts against the pin 22 when the engaging pin 19 downwardly slides along the through hole 20 until it abuts against a lower end edge thereof. Consequently, an impact load is borne by the linkage 16 at three points i.e. the fulcrum point A, the abutting point of the stopper pin 22 against the upper side edge 18a of the first stay 18, and the abutting point of the engaging pin 19 against the through hole 20.

With such arrangement, in the event that the vehicle is involved in a crash, for instance, while the cushioned seat 11 is lifted, together with the buckle 13, to the uppermost position, as shown by the two-dot-chain lines in FIG. 5, the linkage 16 is brought into and held in the uppermost position shown by the two-dot-chain lines in FIG. 5, where the linkage 16 cannot be further extended, to thereby immediately restrain the occupant. On the other hand, even when the seat 11 is then in the lowermost position, the linkage 16 is extended by a small amount from the position shown by the solid lines to the position shown by the two-dot-chain lines in FIG. 5. Therefore, the seat belt device according to the invention restrains the occupant at earlier timing than the conventional device.

Figure 2:
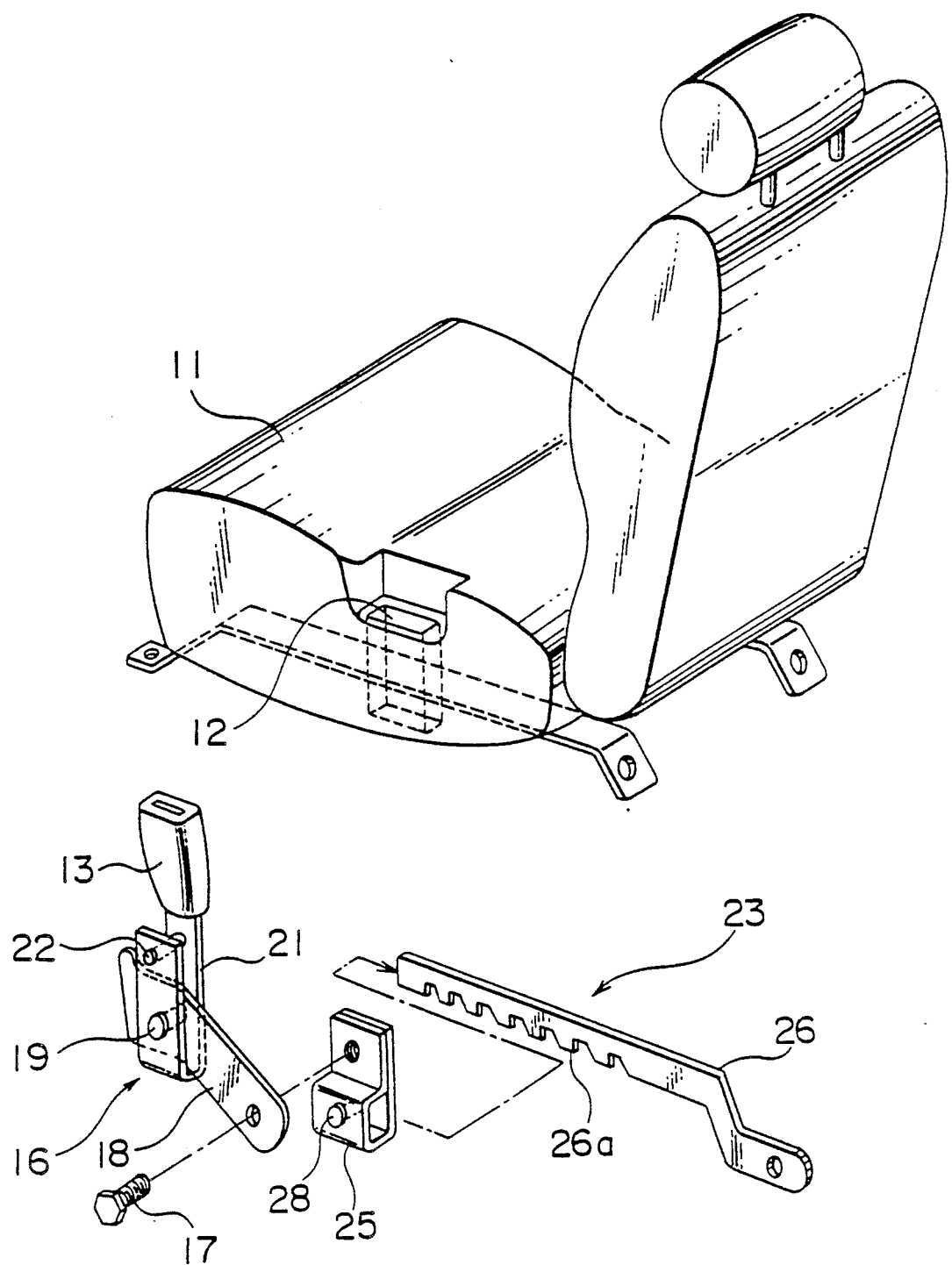
FIG. 2 is an exploded perspective view of essential parts of a seat belt device according to an embodiment of the present invention.
Figure 3:
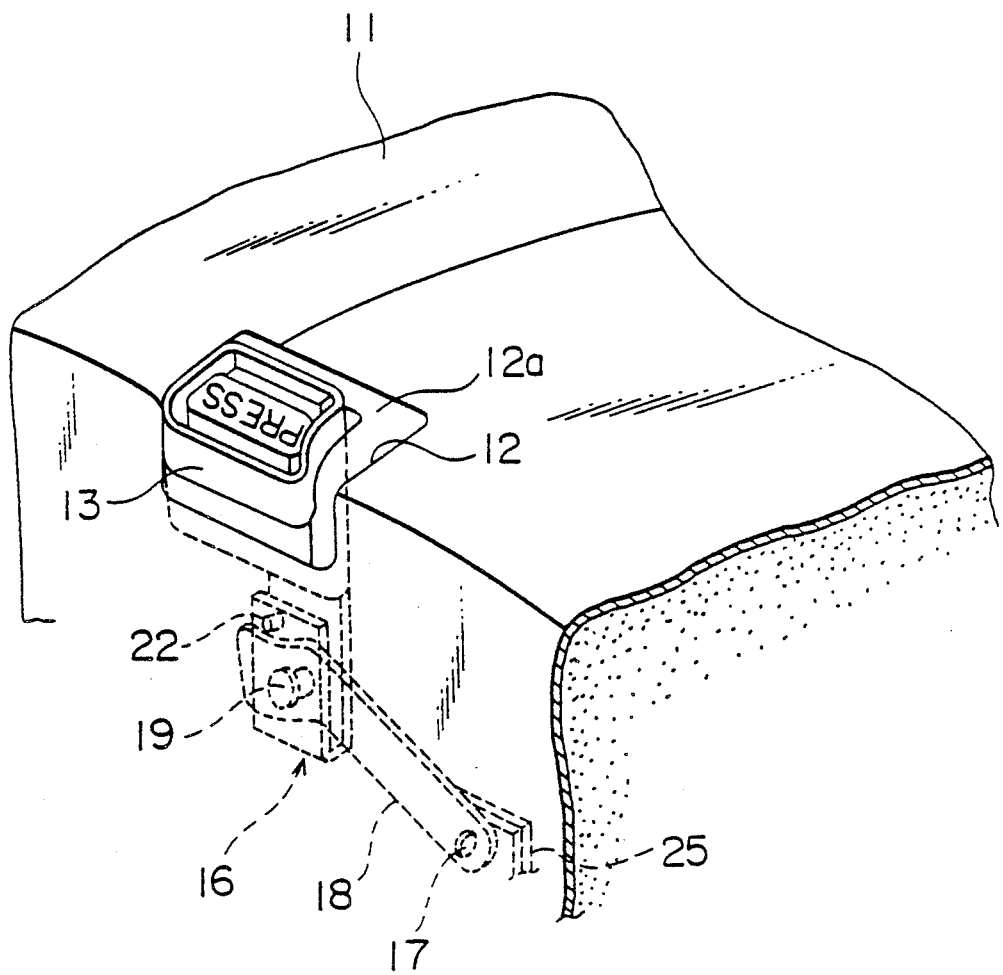
FIG. 3 is a perspective view of the device of FIG. 2 in an assembled state.
Figure 4:
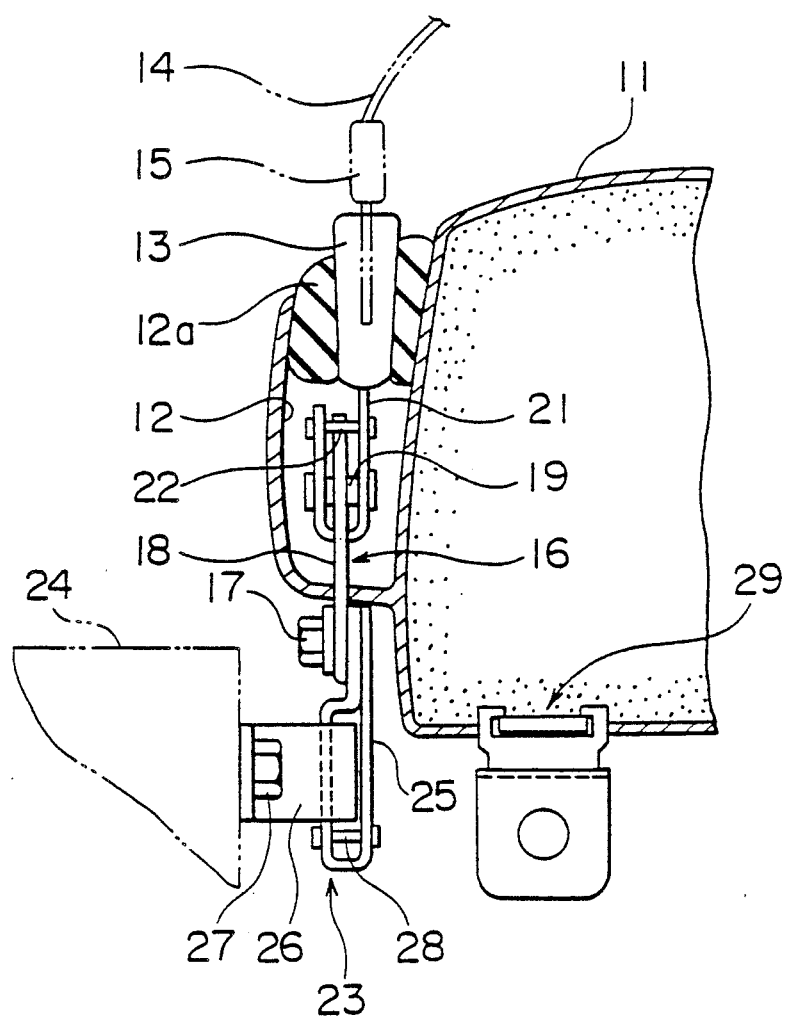
FIG. 4 is a vertical sectional view of the device of FIG. 2.

In the illustrated embodiment, the first stay 18, forming part of the linkage 16, is connected to the vehicle body 24 through a link holder 23. That is, as shown in FIGS. 2 and 4, the link holder 23 comprises a slider 25 in the form of a hollow rectangular parallelepiped, and a saw-toothed guide member 26 fitted through the slider 25. The guide member 26 extends in the direction of advancement of the vehicle, with one end thereof connected to the vehicle body 24 by means of a pin or bolt 27. The slider 25 supports the fulcrum pin 17 threadedly fitted therein together with the first stay 18 and is slidably movable along the guide member 26. The slider 25 has an engaging pin 28 secured thereto, which becomes engaged with saw teeth 26a formed in a lower side edge of the guide member 26 when an upward force is exerted thereupon.

Therefore, the link holder 23 assures positive restraint of the occupant by the linkage 16 supporting the buckle 13 at early timing, regardless of the position of the cushioned seat 11 in the direction of advancement of the vehicle. Alternatively, the first stay 18 may be directly mounted to a seat-supporting rail 29 on which the seat 11 can be slided to adjust the position thereof.

According to the embodiment described above, the movement of the first and second stays 18, 21, forming the linkage 16 for supporting the buckle 13, is limited by the stopper pin 22 to reduce the amount of extension of the linkage 16, whereby in the event of a collision of the vehicle the initial restrainability of the occupant can be enhanced and hence the inertial force caused by the impact and applied to the occupant can be fully mitigated.

What is claimed is:

1. A seat belt device for an automotive vehicle having a body, and seats arranged within said body, the device comprising a safety belt, a buckle by which said safety belt is releasably retained, said buckle being arranged at one of said seats at a lateral side thereof, expansion and retraction-type linkage means for supporting said buckle, said linkage means having first and second stays, said first stay having one end thereof pivoted to said body of said vehicle, said second stay engaging said first stay for pivotal movement relative thereto, said second stay having said buckle secured thereto, wherein said linkage means comprises:
- an engaging protuberance provided on one of said first and second stays,
- an engaging recess formed in the other of said first and second stays, said engaging recess being elongated in a direction in which the other of said first and second stays pivotally moves, said engaging protuberance being engaged in said engaging recess for sliding movement there along while said first and second stays pivotally move in a direction in which said linkage means extends, and
- stopper means provided on one of said first and second stays for stopping further pivotal movement of said first and second stays in the direction in which said linkage means extends, said stopper means being disposed so as to abut the other of said first and second stays when said first and second stays pivotally move by a predetermined amount in the direction in which said linkage means extends, wherein said stopper means abuts the other of said first and second stays substantially simultaneously when said engaging protuberance abuts against one end of said engaging recess.

2. A seat belt device as claimed in claim 1, wherein said second stay has one end thereof configured to abut against one side edge of said first stay, said second stay being pivotally movable about a point on said one side edge of said first stay, against which said one end of said second stay abuts.

3. A seat belt device as claimed in claim 1, wherein said stopper comprises a pin secured on said second stay and disposed to abut one side edge of said first stay.

4. A seat belt device as claimed in claim 1, wherein said engaging recess is an arcuate hole formed in the other of said first and second stays and extending along an orbital path depicted by said first stay.

5. A seat belt device as claimed in claim 4, wherein said arcuate hole is formed in said first stay, said engaging protuberance being secured to said second stay.

6. A seat belt device as claimed in claim 5, wherein said first stay is formed by a flat plate, said second stay being formed by a U-bent plate having a U-shaped bottom, and opposite side walls, said first stay having one end thereof movably fitted in said U-shaped bottom, said engaging protuberance being formed by a pin secured to said opposite side walls.

7. A seat belt device as claimed in claim 1, further including link holder means for selectively holding said first stay at any of a plurality of different positions in a direction of advancement of said vehicle.

8. A seat belt device as claimed in claim 7, wherein said link holder means comprises a guide member having engaging teeth formed thereon and extending in said direction of advancement of said vehicle, and a slider slidably fitted on said guide member and selectively engaged by any of said engaging teeth, said first stay being supported by said slider.

* * * * *